United States Patent [19]

Pavljuchenko et al.

[11] 4,349,649
[45] Sep. 14, 1982

[54] PROCESS OF PREPARING COPOLYMERS OF BUTYL ACRYLATE AND 1-(α-ALKYL ACRYLATE)-1-TERT-BUTYL PEROXY ETHANES

[76] Inventors: Valery N. Pavljuchenko, prospekt Energetikov, 34, kv. 53; Zinaida M. Pessina, ulitsa Pskovskaya, 6, kv. 17; Elena D. Vasilieva, prospekt Lunacharskogo, 110, kv. 324; Sergei S. Ivanchev, ulitsa Nalichnaya, 36/3, kv. 97, all of Leningrad, U.S.S.R.

[21] Appl. No.: 212,703
[22] PCT Filed: Mar. 13, 1979
[86] PCT No.: PCT/SU79/00015
 § 371 Date: Nov. 13, 1980
 § 102(e) Date: Nov. 6, 1980
[87] PCT Pub. No.: WO80/01916
 PCT Pub. Date: Sep. 18, 1980

[51] Int. Cl.³ .................. C08F 2/00; C08F 220/10
[52] U.S. Cl. .................. 526/234; 526/328.5
[58] Field of Search .................. 526/234, 328, 328.5

[56] References Cited
U.S. PATENT DOCUMENTS
4,130,705 12/1978 Sevcik .................. 526/328

*Primary Examiner*—Harry Wong, Jr.
*Attorney, Agent, or Firm*—Steinberg & Raskin

[57] ABSTRACT

The process for preparing copolymers of butyl acrylate and 1-(α-alkyl acrylate)-1-tert-butyl peroxy ethanes comprises performing emulsion copolymerization of butyl acrylate and 1-(α-alkyl acrylate)-1-tert-butyl peroxy ethanes in the presence of an initiating system consisting of sodium metabisulfite in an amount of 0.008 to 1.650% of the total mass of monomers and a compound of the general formula $Na_xH_yS_zO_3$, where "x" is an integer of 1 or 2, "y" is zero or 1, "z" is an integer of 1 or 2, said compound being in an amount of 0.002 to 0.360% of the total mass of monomers. In accordance to the required characteristics of the copolymers, i.e. extent of the final product swelling and the gel fraction content therein, the initiating system amount is determined from the formula:

$$\log c = \frac{\log(\alpha - 800) - \log 2{,}300}{0.26} \text{ or}$$

$$\log c = -\frac{\log(G + 200) - \log 260}{0.04}, \text{ where}$$

c—amount of the initiating system, in % of the mass of initial monomers;
α—extent of the final product swelling, in % of the final product mass;
G—gel fraction content of the final product, in % of the final product mass.

1 Claim, No Drawings

PROCESS OF PREPARING COPOLYMERS OF BUTYL ACRYLATE AND 1-(α-ALKYL ACRYLATE)-1-TERT-BUTYL PEROXY ETHANES

FIELD OF THE INVENTION

The present invention relates to the field of preparing reactive rubbers, and more particularly to a process of preparing copolymers of butyl acrylate and 1-(α-alkyl acrylate)-1-tert-butyl peroxy ethanes.

The proposed compounds can find application in producing weather-resistant and impact-resistant styrene copolymers by means of emulsion polymerization and ridged styrene graft-copolymers. Furthermore, copolymers of butyl acrylate and 1-(α-alkyl acrylate)1-tert-butyl peroxy ethanes can be used in the production of oil- or ozone-resistant rubbers, in which process rubber vulcanization might be accomplished with no vulcanizing agent being introduced into the rubber mixture.

DESCRIPTION OF THE PRIOR ART

Known in the art is a process for preparing reactive alkyl acrylate rubbers by means of emulsion copolymerization of alkyl acrylates, butyl acrylate in particular, with bifunctional acryl monomers, such as β-chloroethyl- or glycidylmethacrylate (cf. USSR Inventor's Certificate No. 254,770 published in Bulletin "Otkrytia, izobretenia, promyshlennye obraztsy i tovarnye znaki," No. 32, 1969, p. 81). Copolymerization of styrene, butyl acrylate, and β-chloroethyl methacrylate is carried out in emulsion at the ratio of the aqueous phase to hydrocarbon phase of 2.1 and 4.1, in the presence of alkyl sulfonate as an emulsifier, and the oxidation-reduction system comprising isopropyl benzene hydroperoxide-rongalite-ferric trilon complex, at a temperature of 30° to 70° C. The monomer conversion mounts up to 95–98% in 2.0–2.5 hours.

The rubbers produced therewith prove to be non-crosslinked ones and thus are completely soluble in organic solvents and monomers. The copolymers resulting from graft-copolymerization of styrene and acrylonitrile with non-crosslinked rubbers, exhibit inadequately high physical-and-mechanical properties, and the resulting reactive rubbers require further treatment for the purpose of their crosslinking.

Also known in the art is a process of crosslinking alkyl acrylate rubbers during their synthesis by using di- or trivinyl monomers, e.g. unsaturated symmetrical triazine compounds of the general formula

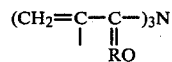

(cf. Japanese Pat. No. 51-8154).

According to this process, butyl acrylate, 99 parts by weight, and unsaturated symmetrical triazine compound

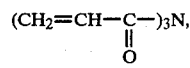

1 part by weight, are added to the aqueous solution containing potassium persulfate ($K_2S_2O_8$), 0.5 part by weight, sodium oleinate, 2 parts by weight, and sodium sulfite $Na_2SO_3$, 0.05 parts by weight, in water, 200 parts by weight, and then polymerized in a stream of nitrogen for 3 hours at a temperature of 60° C. and further 3 hours at a temperature of 70° C. to achieve 95% conversion. The polymer thus produced is precipitated with sodium chloride and dried. The resulting rubber mixture, 100 parts by weight, is then subjected to vulcanization with benzoyl peroxide, 2 parts by weight, and zinc oxide, 5 parts by weight, for 2 hours at a temperature of 120° C. The benzene uptake by the vulcanizate accounted for 230%.

The resulting rubbers are non-reactive ones, which only poorly take part in the graft-reaction, and thus their use in the production of impact-resistant copolymers is irrational.

Also known in the art is a process of preparing reactive, partly crosslinked alkyl acrylate rubbers by means of emulsion copolymerization of alkyl acrylates with an unsaturated peroxide compound, namely 1-(α-alkyl acrylate)-1-tert-butyl peroxy ethane in the presence of initiating system consisting of a potassium persulfate and sodium metabisulfite, charging of the polymerizable mixture components being accomplished portion-wise and 1-methacrylate-1-tert-butyl peroxy ethane being introduced into the reaction mixture under conditions of 90 to 100% conversion of butyl acrylate of its total charge.

The process of emulsion copolymerization of the initial monomers is carried out at a temperature of 20° C., pH-value of the reaction mixture being maintained within the limits of 7.5–9.0. Anionic surface-active agents, e.g. sodium salts of fatty sulfo-acids, are used as emulsifiers.

In this case, crosslinking of reactive rubber takes place as a result of partial decomposition of the polymer peroxide groups in the process of synthesis. However, such decomposition of peroxide groups is uncontrollable, thus making it impossible to prepare rubber of both the specified content of the bound insoluble fraction, i.e. gel-fraction, and preset crosslinking extent, or to change these parameters, as desired, by varying the polymerization conditions.

Possibility to control the rubber crosslinking level and its gel content within the specified limits is of essential importance for subsequent use of the resulting rubbers in the synthesis of impact-resistant copolymers, physical-and-mechanical properties of which are largely determined by the extent of crosslinking of rubber particles.

SUMMARY OF THE INVENTION

The principal object of the present invention is to control within the specified limits physical-and-mechanical properties of the prepared copolymers, such as the gel-fraction content of the copolymer and the level of its crosslinkage by selecting novel initiating system.

With this principal object in view, there is provided a process of preparing copolymers of butyl acrylate and 1-(α-alkyl acrylate)-1-tert-butyl peroxy ethanes by means of emulsion copolymerization of butyl acrylate with 1-(α-alkyl acrylate)-1-tert-butyl peroxy ethanes in the presence of an initiating system, wherein, according to the invention, the initiating system comprises sodium metabisulfite in amount of 0.008–1.640% of the total mass of monomers and a compound of the general formula $Na_xH_yS_zO_3$, where "x"—an integer of 1 or 2, "y"—zero or 1, "z"—an integer of 1 or 2, said compound being in an amount of 0.002–0.360% of the total mass of monomers.

According to the required copolymer characteristics, i.e. extent of the final product swelling and the gel fraction content therein, amount of the initiating system is calculated from the formula:

$$\log c = \frac{\log(\alpha - 800) - \log 2{,}300}{0.26} \text{ or}$$

$$\log c = -\frac{\log(G + 200) - \log 260}{0.04}, \text{ where}$$

c—amount of the initiating system in percent of the mass of initial monomers;
α—extent of the final product swelling in percent of the final product mass;
G—gel fraction content of the final product in percent of the final product mass.

Best Mode for Carrying Out the Invention

The proposed process for preparing copolymers of butyl acrylate and 1-(α-alkyl acrylate)-1-tert-butyl peroxy ethanes is performed as follows.

The process of emulsion copolymerization of the initial monomers is carried out in a thermostatically controlled (20° C.) reaction vessel fitted with a stirrer, a return condenser, and a tube adapted to supply an inert gas, pH-value of the reaction mixture being maintained within the limits from 7.5 to 9.0.

Anionic surface-active agents, e.g. sodium salts of fatty sulfoacids, are used as emulsifiers.

The reaction vessel is charged with water, an emulsifier, and a pH-adjusting agent (borax). Upon dissolution of the emulsifier and borax, the first portion of the monomer mixture is introduced under stirring into the reaction vessel and emulsified, the reaction mixture being purged with an inert gas (argon) for 10 min. Then the initiating system is charged and the reaction is performed in a continuous stream of the inert gas.

In one hour from onset of the reaction (from the moment of charging the initiating system into the reaction mixture), the second portion of monomers is introduced, the third portion being added in two hours, the fourth portion, in three hours from the polymerization onset. In four hours the synthesis is completed.

The copolymerization process is carried out in the presence of sodium metabisulfite in amount of 0.008–1.640 percent of the total mass of monomers and a compound of the general formula $Na_xH_yS_zO_3$, where "x"—an integer of 1 or 2, "y"—zero or 1, "z"—an integer of 1 or 2, said compound being in amount of 0.002–0.360 percent of the total mass of monomers. As 1-(α-alkyl acrylate)-1-tert-butyl peroxy ethane, a substance is used of the general formula:

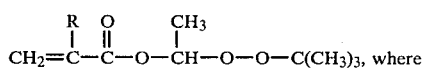

R—alkyl radicals from $CH_3$ to $C_5H_{11}$.

1-(α-alkyl acrylate)-1-tert-butyl peroxy ethanes are prepared by interacting α-chloroethyl-tert-butyl peroxide with appropriate unsaturated acids in the presence of triethyl amine according to the following scheme:

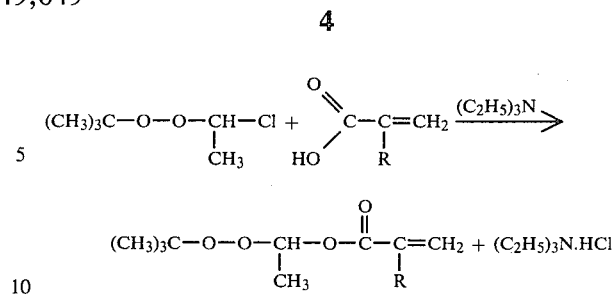

The synthesis is performed with an equimolecular ratio of reagents.

The process for preparing 1-(α-alkyl acrylate)-1-tert-butyl peroxy ethanes is as follows. A reactor thermostatically controlled to be in the temperature range from 20° to 70° C. is charged with α-chloroethyltert-butyl peroxide and α-alkyl acrylic acid in petroleum ether, triethylamine being added under stirring at such a rate that a temperature within the reactor is not above the preset value. The stirring is stopped in 2–3 hours. The precipitated salt (triethylamine hydrochloride) is filtered off, the resulting solution is washed with soda and water to neutrality and then dried over magnesium sulfate. The solvent is distilled off in vacuum. Yield of the desired product amounts to 90–92%.

The copolymer crosslinking level defined by the extent of copolymer swelling in benzene, as well as the gel content of copolymer, can be regulated within sufficiently wide limits by using the proposed process: the extent of swelling being from 1,500 to 3,000 percent of the final product mass.

For a better understanding of the present invention specific examples are given hereinbelow to illustrate the proposed process for preparing copolymers of butyl acrylate and 1-(α-alkyl acrylate)-1-tert-butyl peroxy ethanes.

EXAMPLE 1

360 g (109 mass percent) of water, 4.95 g (1.51% by mass) of the mixture of sodium alkyl sulfonates having a hydrocarbon radical of $C_{12}H_{25}$ to $C_{18}H_{37}$, 1.40 g (0.42% by mass) of borax ($Na_2B_4O_7\cdot 10H_2O$) are charged into a reaction vessel thermostatically controlled at 20° C. and furnished with a stirrer, a return condenser, and a tube for supplying an inert gas. Upon dissolution of the emulsifier and borax, the reactor is charged with 60 g (18.2% by mass) of butyl acrylate and 6 g (1.82% by mass) of 1-methacrylate-1-tert-butyl peroxy ethane, under stirring.

1-methacrylate-1-tert-butyl peroxy ethane is prepared as follows. 151.5 g (1 mole) of α-chloroethyl-tert-butyl peroxide and 86 g (1 mole) of methacrylic acid in 1,000 ml of petroleum ether are heated up to a temperature of 30° C., whereupon 101 g (1 mole) of triethyl amine are added. In 3 hours the resulting solution is filtered, washed with soda and then with water, and dried over magnesium sulfate, the solvent being distilled off. 182 g of 1-methacrylate-1-tert-butyl peroxy ethane are thus obtained, the yield is 90%.

Next steps are emulsification of the initial monomers and blowing of the reaction mixture with an inert gas (argon) for 10 min., followed by charging the initiating system.

To obtain preset values of the swelling extent and the gel fraction content, amount of the initiating system is determined according to the formula:

$$\log c = \frac{\log (\alpha - 800) - \log 2{,}300}{0.26} \text{ or}$$

$$\log c = -\frac{\log (G + 200) - \log 260}{0.04},$$

where:
- c—the initiating system amount in percent of the total mass of monomers
- α—swelling extent of the final product in percent of the final product mass
- G—gel fraction content of the final product in percent of the final product mass.

In accordance with above formulas, to prepare copolymer having the swelling extent α=1,500% of the copolymer mass and the gel fraction content G=95% of the copolymer mass, the initiating system level accounts for 0.01% of the total mass of monomers. The initiating system is composed of sodium metabisulfite in amount of 0.027 g (0.0082% of the total mass of monomers) and sodium sulfite in amount of 0.006 g (0.0018% of the total mass of monomers). Upon charging the initiating system, the reaction is carried out in a continuous stream of inert gas.

In one hour from beginning of the reaction (from the moment of charging the initiating system), the second portion of comonomers consisting of 75 g (22.7% of the total mass of monomers) of butyl acrylate and 7.5 g (2.27 percent of the total mass of monomers) of 1-methacrylate-1-tert-butyl peroxy ethane is introduced. In two hours from beginning of the reaction the third portion of comonomers consisting of 90 g (27.3% of the total mass of monomers) of butyl acrylate and 9 g (2.73% of the total mass of monomers) of 1-methacrylate-1-tert-butyl peroxy ethane is introduced. In three hours from the copolymerization onset the fourth portion of comonomers consisting of 75.0 g (22.7% of the total mass of monomers) of butyl acrylate and 7.5 g (2.27% of the total mass of monomers) of 1-methacrylate-1-tert-butyl peroxy ethane is added. The synthesis is completed in 4 hours from the reaction onset.

The resulting copolymer latex has the following characteristics:

| | |
|---|---|
| dry residue | 43% of the latex mass |
| average particle diameter | 0.070 μm. |

To determine the swelling extent of the copolymer and the gel content therein, the copolymer latex is coagulated with ethyl alcohol (10 volumes), and the copolymer thus produced is washed with alcohol, dried in the air and then in a vacuum-drier (at a temperature of 20° C.) up to a constant weight.

Characteristics of the final product (copolymer of butyl acrylate and 1-methacrylate-1-tert-butyl peroxy ethane) are as follows:

| | |
|---|---|
| content of the peroxide monomer units | 8.0% of the copolymer mass; |
| swelling extent in benzene | 1,480 percent of the copolymer mass; |
| gel content | 94.5 percent of the copolymer mass. |

EXAMPLE 2

The copolymerization process is similar to that described in Example 1, except that to prepare a copolymer exhibiting the swelling extent α=1,900% of the copolymer mass and the gel fraction content G=90% of the copolymer mass, the initiating system consisting of 0.13 g (0.039% of the total mass of monomers) of sodium metabisulphite and 0.086 g (0.026% of the total mass of monomers) of sodium sulphite is used in an amount of 0.065% of the total mass of monomers.

Characteristics of the copolymer latex thus produced are as follows:

| | |
|---|---|
| dry residue | 44.8% of the latex mass |
| average particle diameter | 0.068 μm |

The copolymer characteristics:

| | |
|---|---|
| content of the peroxide monomer units | 8.1% of the copolymer mass |
| swelling extent in benzene | 1,930% of the copolymer mass |
| the insoluble part content | 90.0% of the copolymer mass. |

EXAMPLE 3

The copolymerization process is similar to that described in Example 2, except that a different ratio of the initiating system components is used, i.e. 0.175 g (0.053% of the total mass of monomers) of sodium metabisulfite and 0.040 g (0.012% of the total mass of monomers) of sodium sulfite.

Characteristics of the resulting copolymer latex are as follows:

| | |
|---|---|
| dry residue | 44.8% of the latex mass |
| average particle diameter | 0.070 μm. |
| The copolymer characteristics: | |
| content of the peroxide monomer units | 8.1% of the copolymer mass |
| swelling extent in benzene | 1,910% of the copolymer mass |
| gel content | 91.0% of the copolymer mass. |

EXAMPLE 4

The copolymerization process is similar to that described in Example 2, except that 1-(α-amyl acrylate)-1-tert-butyl peroxy ethane is used as a peroxide comonomer. Synthesis of 1-(α-amyl acrylate)-1-tert-butyl peroxy ethane is accomplished as specified in Example 1, except that α-amyl acrylic acid (136 g—1 mole) is used instead of methacrylic acid. 238 g of 1-(α-amyl acrylate)-1-tert-butyl peroxy ethane are obtained, the yield being 92%.

Characteristics of the resulting copolymer latex are as follows:

| | |
|---|---|
| dry residue | 45% of the latex mass |
| average particle diameter | 0.068 μm. |
| The copolymer characteristics: | |
| content of the peroxide monomer units | 8.20% of the copolymer mass |
| swelling extent in benzene | 1,900% of the copolymer mass |
| gel content | 90.0% of the copolymer mass. |

EXAMPLE 5

The copolymerization process is similar to that described in Example 2, except that 1-(α-propyl acrylate)-1-tert-butyl peroxy ethane is used as a peroxide comonomer. Synthesis of 1-(α-propyl acrylate)-1-tert-butyl peroxy ethane is performed as shown in Example 1 using α-propyl acrylic acid (112 g—1 mole) instead of methacrylic acid.

207 g of 1-(α-propyl acrylate)-1-tert-butyl peroxy ethane are produced, the yield being 90.0%.

Characteristics of the resulting copolymer latex are as follows:

| | |
|---|---|
| dry residue | 45.0% of the latex mass |
| average particle diameter | 0.068 μm. |
| The copolymer characteristics: | |
| content of the peroxide monomer units | 85.2% of the copolymer mass |
| swelling extent in benzene | 1,900% of the copolymer mass |
| gel content | 90.0% of the copolymer mass. |

EXAMPLE 6

The copolymerization process is carried out as shown in Example 1, except that to prepare a copolymer exhibiting the swelling extent α=3,000% of the copolymer mass and the gel fraction content G=60% of the copolymer mass, the initiating system consisting of 2.7 g (0.92% of the total mass of monomers) of sodium metabisulfite and 0.6 g (0.18% of the total mass of monomers) of sodium sulfite is charged into a reaction vessel in an amount of 1.1% of the total mass of monomers.

Characteristics of the copolymer latex thus produced are as follows:

| | |
|---|---|
| dry residue | 44.9% of the latex mass |
| average particle diameter | 0.070 μm. |
| The copolymer characteristics: | |
| content of the peroxide monomer units in the rubber | 7.0% of the copolymer mass |
| swelling extent in benzene | 305% of the copolymer mass |
| gel content | 61% of the copolymer mass. |

EXAMPLE 7

The copolymerization process is performed as specified in Example 5, except that to prepare a copolymer having the swelling extent α=3,800% of the copolymer mass and the gel fraction content G=50% of the copolymer mass, the initiating system composed of 5.4 g (1.64% of the total mass of monomers) of sodium metabisulfite and 1.2 g (0.36% of the total mass of monomers) of sodium sulfite is added to the reaction mixture to the extent of 2.0 percent of the total mass of monomers.

Characteristics of the copolymer latex thus prepared are as follows:

| | |
|---|---|
| dry residue | 44.8% of the latex mass |
| average particle diameter | 0.068 μm. |
| Characteristics of the copolymer: | |
| content of the peroxide monomer units | 6.8% of the copolymer mass |
| swelling extent in benzene | 3,780% of the copolymer mass |
| gel content | 49.3% of the copolymer mass. |

EXAMPLE 8

The copolymerization process is accomplished as described in Example 2, except that the initiating system consisting of 0.185 g (0.055% of the total mass of monomers) of sodium metabisulfite and 0.03 g (0.01% of the total mass of monomers) of sodium bisulfite is used.

Characteristics of the resulting copolymer latex are as follows:

| | |
|---|---|
| dry residue | 44.9% of the latex mass |
| average particle diameter | 0.070 μm. |
| Characteristics of the copolymer: | |
| content of the peroxide monomer units | 8.0% of the copolymer mass |
| swelling extent in benzene | 1,900% of the copolymer mass |
| gel content | 90% of the copolymer mass. |

EXAMPLE 9

The copolymerization process is carried out as shown in Example 8, except that the initiating system composed of 0.139 g (0.042% of the total mass of monomers) of sodium metabisulfite and 0.076 g (0.023% of the total mass of monomers) of sodium bisulfite is used.

Characteristics of the resulting copolymer latex are as follows:

| | |
|---|---|
| dry residue | 44.9% of the latex mass |
| average particle diameter | 0.070 μm. |
| Characteristics of the copolymer: | |
| content of the peroxide monomer units | 8.0% of the copolymer mass |
| swelling extent | 1,900% of the copolymer mass |
| gel content | 90% of the copolymer mass. |

EXAMPLE 10

The copolymerization process is performed as specified in Example 1, except that the initiating system consisting of 0.115 g (0.035% of the total mass of monomers) of sodium metabisulfite and 0.1 g (0.03% of the total mass of monomers) of sodium bisulfite is used.

Characteristics of the copolymer latex thus prepared are as follows:

| | |
|---|---|
| dry residue | 44.9% of the latex mass |
| average particle diameter | 0.070 μm. |
| Characteristics of the copolymer: | |
| content of the peroxide monomer units | 8.0% of the copolymer mass |
| swelling extent in benzene | 1,900% of the copolymer mass |
| gel content | 90% of the copolymer mass. |

EXAMPLE 11

The copolymerization process is carried out as described in Example 8, except that to prepare a copolymer having the swelling extent α=2,300% of the copolymer mass and the gel fraction content G=74% of the copolymer mass, the initiating system consisting of 0.672 g (0.2% of the total mass of monomers) of sodium metabisulfite and 0.198 g (0.06% of the total mass of monomers) of sodium bisulfite is introduced into the reaction mass to the extent of 0.2% of the total mass of monomers.

Characteristics of the resulting copolymer latex are as follows:

| | |
|---|---|
| dry residue | 45% of the latex mass |
| average particle diameter | 0.070 μm. |
| Characteristics of the copolymer: | |
| content of the peroxide monomer units | 7.8% of the copolymer mass |
| gel content | 73.6% of the copolymer mass |
| swelling extent in benzene | 2,250% of the copolymer mass. |

EXAMPLE 12 (CONTROL)

Copolymerization of butyl acrylate and 1-methacrylate-1-tert-butyl peroxy ethane is accomplished in emulsion in a manner similar to that shown in Example 1, except that the oxidation-reduction system consisting of 1.12 g (0.34% of the total mass of monomers) of potassium persulfate and 0.53 g (0.16% of the total mass of monomers) of sodium metabisulfite is added to the reaction mixture.

Characteristics of the copolymer latex thus produced are as follows:

| | |
|---|---|
| dry residue | 44.8% of the latex mass |
| average particle diameter | 0.100 μm. |
| Characteristics of the copolymer: | |
| content of the peroxide monomer units | 9.8% of the copolymer mass |
| swelling extent in benzene | 2,500% of the copolymer mass. |
| gel content | 100% of the copolymer mass. |

Attempts to change the copolymer crosslinking degree and the gel content therein by changing the amounts of oxidation-reduction system or peroxide monomer were unsuccessful, the gel content and the swelling extent of rubber remaining unchanged.

Industrial Applicability

The present invention makes it possible to regulate both the copolymer gel content and its crosslinking extent within specified limits, which fact is of great importance for subsequent application of the prepared copolymers in the synthesis of impact-resistant copolymers characteristics of which are to a large degree determined by the above parameters.

Considerable advantage can be gained at the stage of using reactive copolymers in the synthesis of impact-resistant copolymers characteristics of which are to a great extent defined by the extent of rubber particle binding. Besides, utilization of the proposed latexes, for instance, in the synthesis of weather-resistant ABS-plastics results in lower expenses for the initiating system, and thus in saving of the source materials.

We claim:

1. A process of preparing copolymers of butyl acrylate and 1-(α-alkyl acrylate)-1-tert-butyl peroxy ethanes by means of emulsion copolymerization of butyl acrylate and 1-(α-alkyl acrylate)-1-tert-butyl peroxy ethanes in the presence of an initiating system wherein alkyl is 1–5 carbon atoms, characterized in that the initiating system consists of sodium metabisulfite in amount of from 0.008 to 1.640% of the total mass of monomers and a compound of the general formula $Na_xH_yS_zO_3$, where "x" is an integer of 1 or 2, "y" is zero or 1, "z" is an integer of 1 or 2, said compound being in amount of from 0.002 to 0.360% of the total mass of monomers.

* * * * *